(12) United States Patent
Takabatake et al.

(10) Patent No.: US 7,903,171 B2
(45) Date of Patent: Mar. 8, 2011

(54) NOTEBOOK INFORMATION PROCESSOR AND IMAGE READING METHOD

(75) Inventors: Masanari Takabatake, Ishikawa (JP); Nobuhisa Yamazaki, Ishikawa (JP); Satoshi Miyamoto, Ishikawa (JP); Jiyun Du, Ishikawa (JP)

(73) Assignee: PFU Limited (JP)

( * ) Notice: Subject to any disclaimer, the term of this patent is extended or adjusted under 35 U.S.C. 154(b) by 352 days.

(21) Appl. No.: 12/251,475

(22) Filed: Oct. 15, 2008

(65) Prior Publication Data

US 2009/0262200 A1    Oct. 22, 2009

(30) Foreign Application Priority Data

Apr. 21, 2008  (JP) ................................. 2008-110612

(51) Int. Cl.
*H04N 1/40* (2006.01)
*G06F 1/16* (2006.01)
*G06K 9/40* (2006.01)

(52) U.S. Cl. .................... 348/376; 361/679.27; 382/275; 358/471

(58) Field of Classification Search .................. 348/373, 348/552, 376; 361/679.55, 679.26, 379.27, 361/679.28; 382/275; 358/471
See application file for complete search history.

(56) References Cited

U.S. PATENT DOCUMENTS

| 7,362,478 B2* | 4/2008 | Mangerson | 358/471 |
| 2008/0151099 A1* | 6/2008 | Lin et al. | 348/376 |
| 2008/0231724 A1* | 9/2008 | Wang | 348/222.1 |
| 2008/0279454 A1* | 11/2008 | Lev et al. | 348/373 |
| 2009/0231483 A1* | 9/2009 | Seddik et al. | 348/373 |
| 2009/0262204 A1* | 10/2009 | Pai et al. | 348/207.11 |
| 2009/0262209 A1* | 10/2009 | Pai et al. | 348/222.1 |

FOREIGN PATENT DOCUMENTS

| JP | 2000-137544 A | 5/2000 |
| JP | 2000-194450 A | 7/2000 |
| JP | 2002-539516 A | 11/2002 |

* cited by examiner

*Primary Examiner* — Jason Whipkey
(74) *Attorney, Agent, or Firm* — Lowe Hauptman Ham & Berner, LLP

(57) ABSTRACT

A notebook information processor includes an image photographing unit, a display, a keyboard, a storage unit, and a control unit, wherein the control unit includes, a live view displaying unit that displays a live view obtained by photographing at least a portion of the keyboard within a photographing area of the image photographing unit on the display, a still image obtaining unit that obtains a still image from the live view displayed on the display by the live view displaying unit, when receiving a photographing start signal to start photographing the still image of a document put on the keyboard, and an image processing unit that performs projective transformation on the still image obtained by the still image obtaining unit so as to obtain an image photographed from a front direction, executes image processing so as to perform cropping to clip the document, and stores a transformed image of the document after the image processing in the storage unit.

18 Claims, 7 Drawing Sheets

WHEN USING AS WEB CAMERA

WHEN USING AS SCANNER

OBTAINED IMAGE → IMAGE OBTAINED BY PROJECTIVE TRANSFORMATION AND CROPPING

NOTEBOOK INFORMATION PROCESSOR AND IMAGE READING METHOD

RELATED APPLICATIONS

The present application is based on, and claims priority from, Japanese Application No. 2008-110612, filed Apr. 21, 2008, the disclosure of which is hereby incorporated by reference herein in its entirety.

BACKGROUND OF THE INVENTION

1. Field of the Invention

The present invention relates to a notebook information processor and an image reading processing method.

2. Description of the Related Art

With a notebook information processor such as conventional PDA terminal and laptop type PC, by way of example, when a user such as a businessman wants to scan a document such as a paper document not at his desk in an office with a well-equipped environment but at a meeting, when visiting a customer, and in a hotel of a business trip destination, it is required to additionally bring a portable scanner or a digital camera.

When additionally bringing the portable scanner, a general commercially available notebook information processor and a portable scanner weigh about 1 to 2 kg and 1.4 kg, respectively, so that they weigh about 3 kg in total and are too heavy for the user to bring. In addition, the user has to keep an installation area of both the notebook information processor and the scanner when scanning.

On the other hand, when using the digital camera in place of the portable scanner, since a compact digital camera weighs about 0.1 to 0.2 kg, for example, weight thereof is not increased so much. However, in this case, it is required to keep an installation area of the notebook information processor and a space to put document such as a paper document to be photographed on. In addition, it is difficult to straightforwardly photograph the document without using a tripod or the like, so that it is required to convert the document photographed by the digital camera as if this is straightforwardly photographed and to perform cropping to clip the document from a background.

Therefore, recently, the notebook information processor having a scanner function has been developed as a portable image input device.

For example, Japanese Patent Application Laid-open No. 2000-137544 discloses a notebook personal computer formed of the lid having a display and a main body having a keyboard, in which a PC card slot is placed on the lid side and the PC card camera is mounted on the PC card slot, and the PC card camera photographs a personal computer operator or the like.

Japanese Patent Application Laid-open No. 2000-194450 discloses an information processor with a document presenting device, in which an illuminating device supporting mechanism, an electric camera, and an electric camera supporting mechanism are added to a laptop personal computer, which is the information processor, so as not to change the external form and size of a casing thereof, and an image of the presented document photographed by using them is captured into the laptop personal computer.

Japanese Patent Application Laid-open No. 2002-539516 discloses a portable electric device in which a charge-coupled device camera is integrated with one wing portion of a portable personal computer and a record document such as a business card is fixed to the other wing portion with a clip or a transparent ribbon, and the charge-coupled device camera photographs the record document.

However, although the conventional portable image input device (Such as Japanese Patent Applications Laid-open Nos. 2000-137544, 2000-194450, and 2002-539516) may act as the notebook information processor having the scanner function, they require the installation area of the document or the like in addition to the installation area of the notebook information processor, and there is the problem in efficiency and accuracy in capturing the image.

Specifically, the conventional portable image input device requires the installation area of the document when capturing the document, and there is the problem that the photographing area may not be adjusted or checked in real time before capturing the image. The conventional portable image input device has the problem that the image processing may not be performed to the captured image so as to obtain the image of the document photographed from the front direction and clipped from the background. That is to say, there is the problem that the user has difficulty in obtaining the desired image in which the document photographed from the front direction is clipped from the background in real time.

For example, in the technology disclosed in Japanese Patent Application Laid-open No. 2000-137544, the PC card slot is placed in the display (lid) such that the PC card camera or the like inserted in the PC card slot does not block the personal computer operation, and the check of the installation area of the document and the photographing area when capturing the document and the image processing to transform to the image photographed from the front direction are not considered.

The technology disclosed in Japanese Patent Application Laid-open No. 2000-194450 is to form the document presenting device having the illumination device and the electric camera so as to be housed in the laptop personal computer and provide the installation area when capturing the document on the rear surface or the side surface of the laptop personal computer, and the check of the photographing area when capturing the document and the image processing to transform to the image photographed from the front direction are not considered.

The technology disclosed in Japanese Patent Application Laid-open No. 2002-539516 is such that the written document or the like to be photographed is fixed to one wing portion of the portable personal computer with the clip or the like, and the user photographs the photographing object by the camera integrated with the other wing portion by positioning the same to the optimal position to reduce defocus of the image, so that this requires fixing operation of the document or the like to be photographed and positioning of the optimal distance of the camera, and the check of the photographing area when capturing the document and the image processing to transform to the image photographed from the front direction are not considered.

That is to say, in the conventional portable image input device technology disclosed in Japanese Patent Applications Laid-open Nos. 2000-137544, 2000-194450, and 2002-539516, to obtain the image photographed from the front direction and in which the document is clipped, which the user desires, there is the problem in efficiency and accuracy when capturing the image that the user himself has to manually adjust the setting of the photographing direction and the focus of the camera, check the image after photographing, and photograph again when the desired image is not obtained.

SUMMARY OF THE INVENTION

It is an object of the present invention to at least partially solve the problems in the conventional technology.

A notebook information processor according to one aspect of the present invention, includes an image photographing unit a display a keyboard a storage unit and a control unit, wherein the control unit includes a live view displaying unit that displays a live view obtained by photographing at least a portion of the keyboard within a photographing area of the image photographing unit on the display, a still image obtaining unit that obtains a still image from the live view displayed on the display by the live view displaying unit, when receiving a photographing start signal to start photographing the still image of a document put on the keyboard, and an image processing unit that performs projective transformation on the still image obtained by the still image obtaining unit so as to obtain an image photographed from a front direction, executes image processing so as to perform cropping to clip the document, and stores a transformed image of the document after the image processing in the storage unit.

A notebook information processor according to another aspect of the present invention, includes an image photographing unit, a display, a keyboard, a storage unit, and a control unit, wherein the control unit includes a live view displaying unit that obtains a live view obtained by photographing at least a portion of the keyboard within a photographing area of the image photographing unit, and performs projective transformation on the obtained live view so as to obtain the live view photographed from a front direction, thereby displaying the live view after the projective transformation on the display, a still image obtaining unit that obtains a still image from the live view displayed on the display by the live view displaying unit, when receiving a photographing start signal to start photographing the still image of a document put on the keyboard, and an image processing unit that executes image processing to the still image obtained by the still image obtaining unit so as to perform cropping to clip the document, and stores a transformed image of the document after the image processing in the storage unit An image reading method according to still another aspect of the present invention is executed by a notebook information processor including an image photographing unit a display a keyboard a storage unit and a control unit. The method includes a live view displaying step of displaying a live view obtained by photographing at least a portion of the keyboard within a photographing area of the image photographing unit on the display, a still image obtaining step of obtaining a still image from the live view displayed on the display at the live view displaying step, when receiving a photographing start signal to start photographing the still image of a document put on the keyboard, and an image processing step of performing projective transformation on the still image obtained at the still image obtaining step so as to obtain an image photographed from a front direction, executing image processing so as to perform cropping to clip the document, and storing a transformed image of the document after the image processing in the storage unit.

An image reading method according to still another aspect of the present invention is executed by a notebook information processor, including an image photographing unit, a display, a keyboard, a storage unit, and a control unit. The method includes a live view displaying step of obtaining a live view obtained by photographing at least a portion of the keyboard within a photographing area of the image photographing unit, and performing projective transformation on the obtained live view so as to obtain the live view photographed from a front direction, thereby displaying the live view after the projective transformation on the display, a still image obtaining step of obtaining a still image from the live view displayed on the display at the live view displaying step, when receiving a photographing start signal to start photographing the still image of a document put on the keyboard, and an image processing step of executing image processing to the still image obtained at the still image obtaining step so as to perform cropping to clip the document, and storing a transformed image of the document after the image processing in the storage unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of a notebook information processor and image reading method and program, and a recording medium according to the present invention will be explained below with reference to the accompanying drawings. The present invention is not limited to the embodiment.

Outline of the Present Invention

An outline of the present invention will be explained below. Thereafter, configurations, processes, and the like of the present invention will be explained below in detail with reference to the FIGS. 1 and 2.

The present invention generally has the following basic characteristic features.

Figure 1:
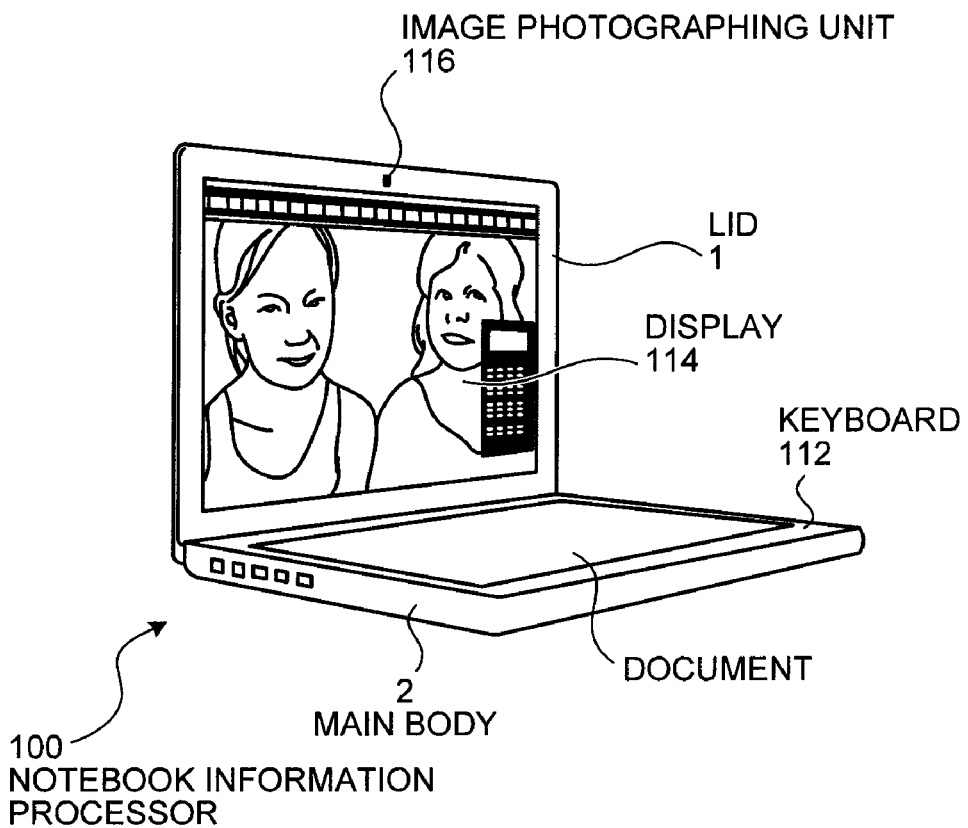
FIG. 1 is a outline drawing showing one example of a configuration of the notebook information processor 100.

As shown in FIG. 1, the notebook information processor 100 is highly portable and does not require an installation area for capturing a document or the like, so that the notebook information processor 100 incorporating an image photographing unit 116 (WEB camera) is used as a virtual scanner device.

In FIG. 1, the image photographing unit 116 (WEB camera) acts as an image input unit, which has a scanner function. A lid 1 (display casing) acts as a camera stand that fixes the image photographing unit 116. A display 114 (display) is used as a monitor screen that displays a live view to be explained later, as an auxiliary light source, and to reproduce a stored image. A keyboard 112 on a main body 2 acts as a document table of the virtual scanner device. Thus the configured notebook information processor 100 may have the scanner function with minimum device weight and installation area.

That is to say, the notebook information processor 100 according to this invention is composed of, for example, the lid 1 (display casing) including at least the image photographing unit 116 and the display 114, and the main body 2 including at least the keyboard 112, a storage unit, and a control unit.

In the present invention, the image photographing unit 116 may be detachably placed in the notebook information processor 100, and this may be electrified by the notebook information processor 100 and communicatably connected to the notebook information processor 100. The image photographing unit 116 may be rotatably placed in the notebook information processor 100 so as to be able to change a photographing direction thereof.

The notebook information processor 100 may further include a rotation angle sensor that detects a rotation angle when rotating the image photographing unit 116 to change the photographing direction thereof. The notebook information processor 100 may include the lid 1 in which at least the image photographing unit 116 is placed, and the main body 2 in which at least the keyboard 112 is placed, and may further include an open angle sensor that detects an open angle of the lid 1 with respect to the main body 2, and a motor that adjusts the rotation angle of the image photographing unit 116.

The control unit of the notebook information processor 100 may adjust the rotation angle of the motor so as to adjust the photographing direction of the image photographing unit 116, based on the open angle detected by the open angle sensor.

Figure 2:
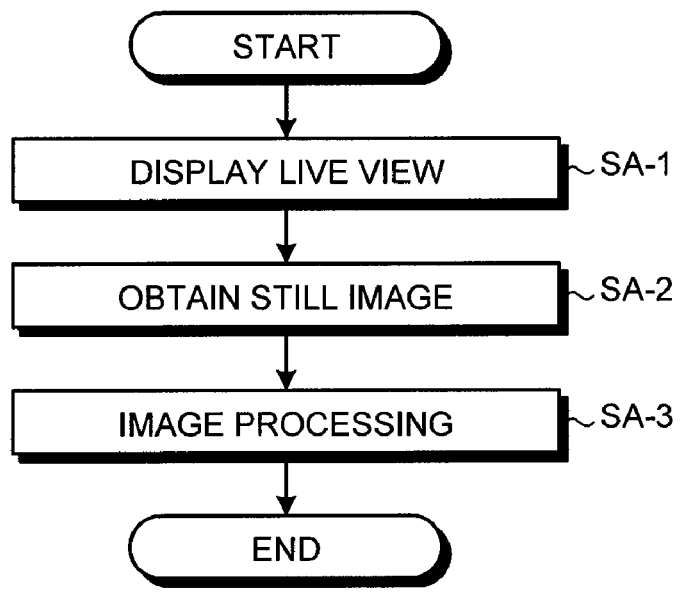
FIG. 2 is a flowchart showing one example of a basic process of the present invention.

As shown in FIG. 2, the control unit of the notebook information processor 100 displays a live view obtained by photographing at least a portion of the keyboard 112 within a photographing area of the image photographing unit 116 on the display 114 (Step SA-1).

The "live view" is a moving image and a still image photographed by the image photographing unit 116, displayed on the display 114 such that a user may check in real time for adjusting the photographing area of the image photographing unit 116.

The control unit of the notebook information processor 100 may obtain the live view obtained by photographing at least a portion of the keyboard 112 within the photographing area of the image photographing unit 116, and perform a projective transformation on the obtained live view so as to obtain the live view photographed from a front direction, thereby displaying the live view after the projective transformation on the display 114.

The control unit of the notebook information processor 100 obtains a still image from the live view displayed on the display 114, when receiving a photographing start signal to start photographing the still image of the document put on the keyboard 112 (Step SA-2).

The "document" is a photographing object (subject) of the still image by the image photographing unit 116, and includes not only a planar one such as a paper document but also a stereoscopic one.

The control unit of the notebook information processor 100 may determine presence of the document by comparing a first image in which the document is not on the keyboard 112 and a second image in which the document is on the keyboard 112 obtained by the image photographing unit 116, and when there is the document, this may generate the photographing start signal to transmit.

The control unit of the notebook information processor 100 may adjust brightness of the display 114 when obtaining the still image at a still image obtaining process (Step SA-2). That is to say, the control unit of the notebook information processor 100 temporally changes the brightness of the display 114 when photographing the document and uses the display 114 as an auxiliary light source.

The control unit of the notebook information processor 100 performs the projective transformation on the obtained still image so as to obtain the image photographed from the front direction, executes image processing so as to perform cropping to clip the document, and stores the transformed image of the document after the image processing in the storage unit (Step SA-3). When displaying the live view after the projective transformation on the display 114 at Step SA-1, the control unit of the notebook information processor 100 may execute the image processing to the obtained still image so as to perform the cropping to clip the document, and store the transformed image of the document after the image processing in the storage unit.

According to the present invention, in the cropping in the image processing (Step SA-3), a corner of the document may be detected by comparing the first image in which the document is not on the keyboard 112 and the second image in which the document is on the keyboard 112 obtained by the image photographing unit 116.

Configuration of Notebook Information Processor 100

A configuration of the notebook information processor 100 will be explained with reference to FIGS. 3 to 9.

Figure 3:
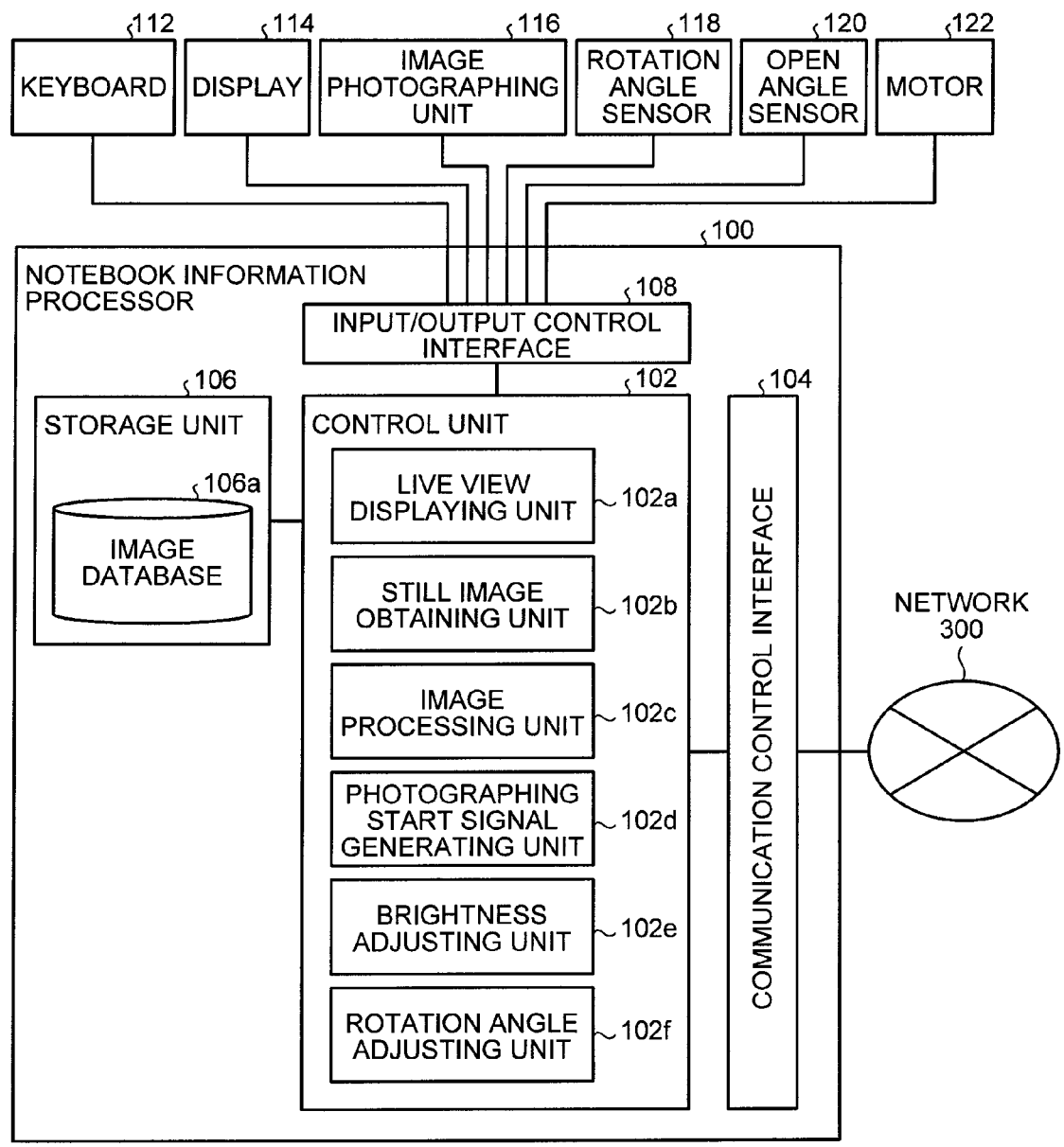
FIG. 3 is a logical configuration block diagram showing one example of a configuration of the notebook information processor 100.

FIG. 3 conceptually shows only parts related to the present invention.

As shown in FIG. 3, the notebook information processor 100 generally includes an image photographing unit 116, a display 114, a keyboard 112, a storage unit 106, a control unit 102, a rotation angle sensor 118, an open angle sensor 120, a motor 122, an input/output control interface unit 108, and a communication control interface 104.

In FIG. 3 the control unit 102 is formed by a Central Processing Unit (CPU) which controls the notebook information processor 100 totally, or the like. The communication control interface 104 connects to a communication device (not shown) such as a router connected to a communication channel or the like, and the input/output interface unit 108 connected to the image photographing unit 116, the display 114, the keyboard 112, the angle sensor 118, the open angle sensor 120, and the motor 122. The storage unit 106 stores various databases and tables. The units composing the notebook information processor 100 are communicably connected through an optional communication channel. Further, the notebook information processor 100 is communicably connected to a network 300 via a communication device such as a router, and a wired or wireless communication line such as a dedicated line.

In FIG. 3, the image photographing unit 116 is a video camera or a digital camera that has a function to photograph the moving image for the live view obtained by photographing at least a portion of the keyboard 112 within the photographing area, and is formed of, for example, a charge coupled device (CCD). The image photographing unit 116 may be incorporated in the notebook information processor 100. The image photographing unit 116 may be detachably placed in the notebook information processor 100, electrified by the notebook information processor 100, and communicatably connected to the notebook information processor 100 (for example, a USB-connected WEB camera or digital camera may be used as the image photographing unit 116).

The image photographing unit 116 may be rotatably placed in the notebook information processor 100 such that a photographing direction is changeable.

An example of rotatably placing the image photographing unit 116 on the notebook information processor 100 so as to be able change the photographing direction thereof is explained with reference to FIGS. 4 and 5.

Figure 4:
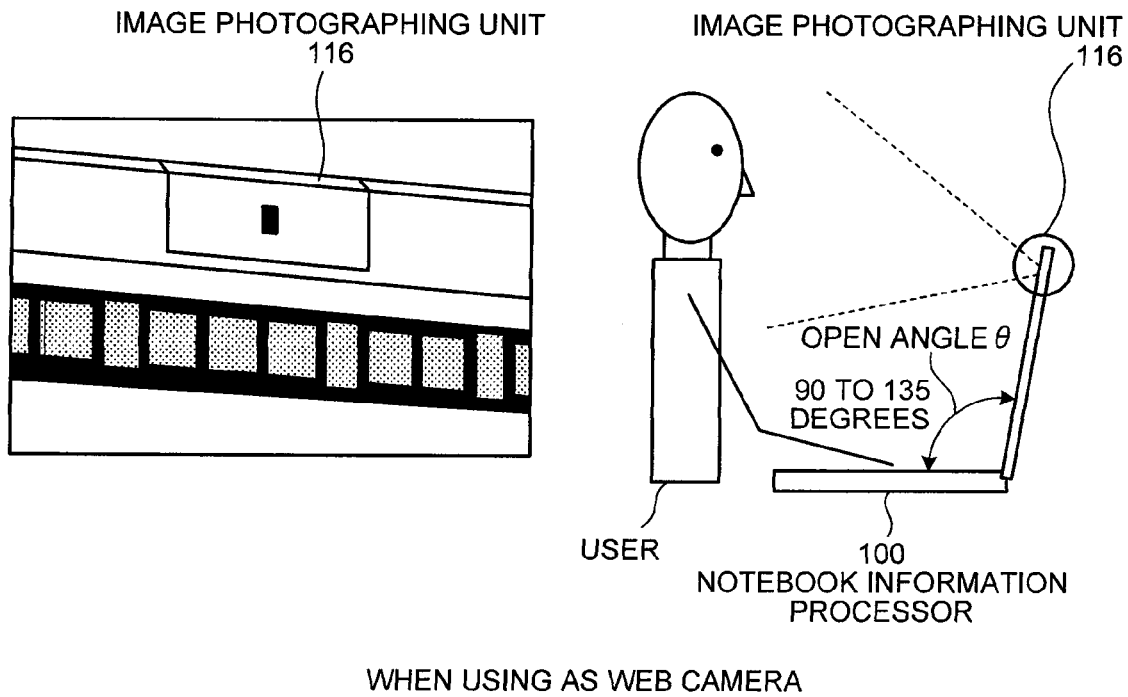
FIG. 4 is a view of an example when using the image photographing unit 116 as the WEB camera.

FIG. 4 is an example when using the image photographing unit 116 as the WEB camera. As shown in FIG. 4, the image photographing unit 116 (WEB camera) is generally incorporated in an upper portion of the lid 1 (display frame) of the notebook information processor 100. The image photographing unit 116 (WEB camera) is generally used in, for example, a television conference and a video chat, and this is used for projecting a PC operator, which is a user. The PC operator generally faces the display 114 (display), so that when placing the photographing unit 116 in the upper portion of the lid 1 (display frame) such that the display 114 (display) plane is perpendicular to a light axis of the image photographing unit 116 (WEB camera) (that is to say, the display plane and a focus plane of the WEB camera are parallel to each other), an object as the WEB camera, such as the television conference and the video chat, is achieved. At that time, an open angle θ of the display 114 (display) plane is generally about 90 to 135 degrees.

Figure 5:
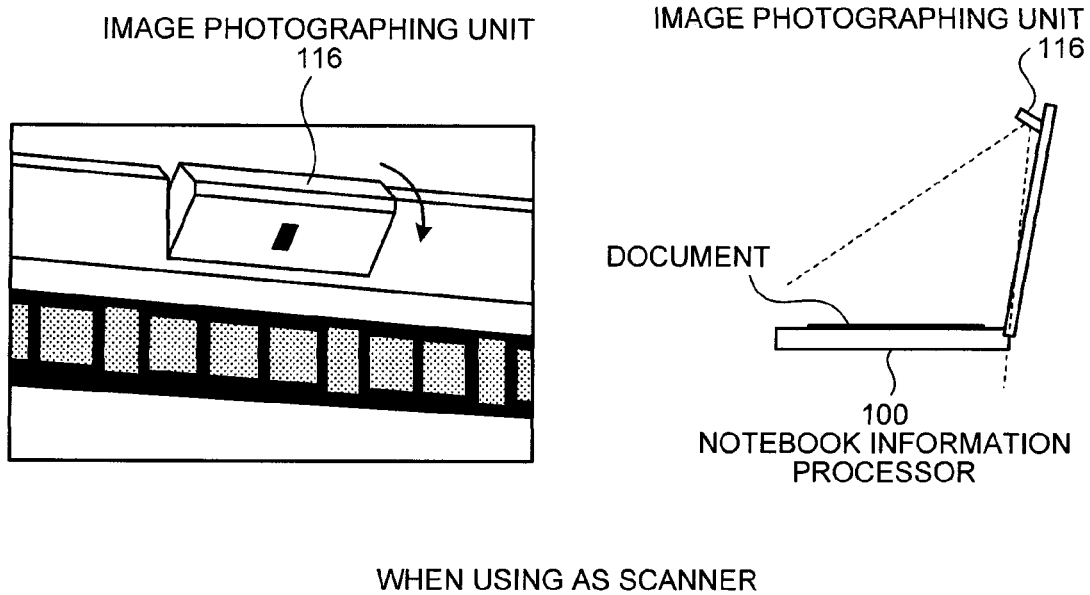
FIG. 5 is a view of an example of using the image photographing unit 116 as the scanner (scanner mode)

FIG. 5 is an example of using the image photographing unit 116 as the scanner (scanner mode). As shown in FIG. 5, it is configured such that only the image photographing unit 116 (WEB camera unit) may be rotated in a state with the open angle θ to direct the light axis to the keyboard 112. Thereby, not only the PC operator but also the document such as the document put on the keyboard 112 may be photographed.

Referring again to FIG. 3, the notebook information processor 100 may further have a rotational angle sensor 118 that detects a rotational angle when rotated so as to change the photographing direction of the image photographing unit 116. The notebook information processor may have the lid 1 in which at least the image photographing unit 116 is placed, and the main body 2 in which at least the keyboard 112 is placed, and may further have an open angle sensor 120 that detects an open angle of the lid 1 with respect to the main body 2, and a motor 122 that adjusts the rotational angle of the image photographing unit 116.

An example of a configuration in which the notebook information processor 100 further includes the rotation angle sensor 118, the open angle sensor 120, and the motor 122 is explained with reference to FIG. 6. The rotational angle sensor 118 and the open angle sensor 120 have a function to detect a rotational angle γ of the image photographing unit 116 and an open angle θ of the notebook information processor 100, and is, for example, a gyro sensor that detects an angular speed and the angle. The motor 122 has a function to rotate the image photographing unit 116.

Figure 6:
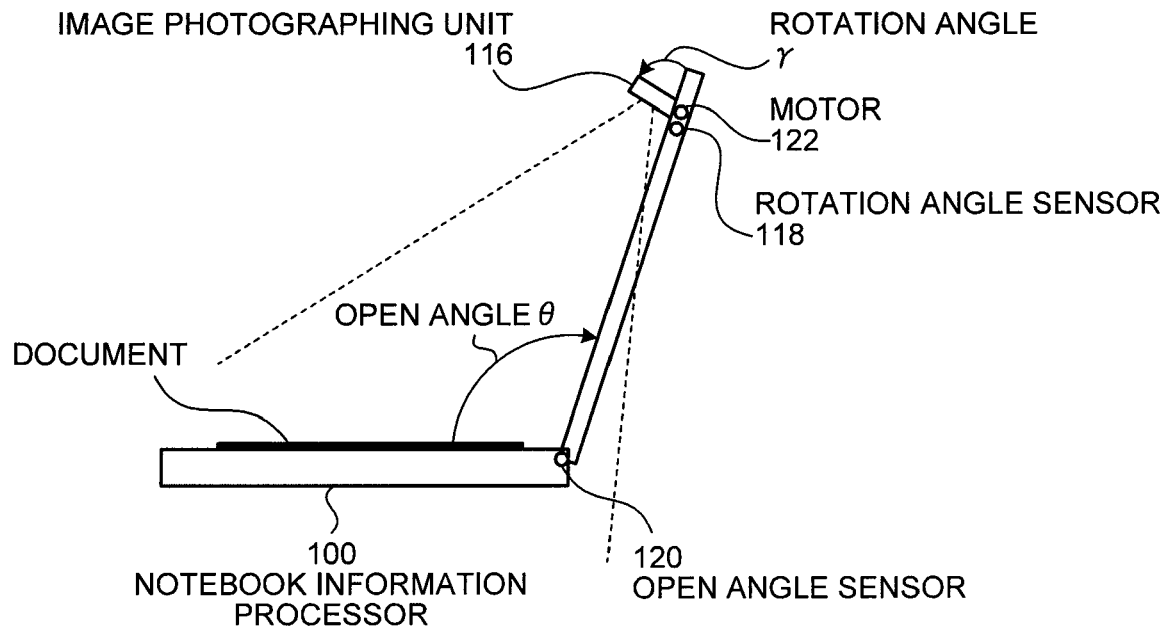
FIG. 6 is physical configuration diagram showing one example of a further configuration of the notebook information processor 100.

As shown in FIG. 6, when the user rotates the image photographing unit 116 (WEB camera) rotatably placed in the notebook information processor 100 so as to photograph a plane (document plane) of the keyboard 112, the rotation angle sensor 118 detects a rotation angle γ of the image photographing unit 116. The control unit 102 of the notebook information processor 100 may automatically launches scanning software to shift to the scanner mode. At that time, since a motion image photographed by the image photographing unit 116 is displayed on the display 114 (display) as the live view in real time, the user may adjust the angle of the image photographing unit 116 while looking at the display 114. When the open angle sensor 120 such as an encoder detects the open angle θ of the display 114 (display), the control unit 102 of the notebook information processor 100 may calculate the rotation angle γ necessary for the image photographing unit 116 (WEB camera) to photograph the plane (document plane) of the keyboard 112 based on the open angle θ, and control to rotate the image photographing unit 116 (WEB camera) by the motor 122 or the like. The control unit 102 of the notebook information processor 100 may calculate the rotation angle γ using an equation: γ=(π−θ)/4 supposing that the open angle is θ in this embodiment.

In FIG. 3, the various databases and the various tables (such as an image database 106a) stored in the storage unit 106 are storage units such as fixed disk devices. The storage units store various programs, various tables, various databases, and the like used in various processes.

Out of each component of the storage unit 106, the image database 106a stores various moving images and still images, and for example, stores the moving images and the still images after various image processings (such as the projective transformation and the cropping) by the control unit 102, in addition to the moving image and the still image of the live view photographed by the image photographing unit 116.

The communication control interface 104 controls communication between the notebook information processor 100 and a network 300 (or a communication device such as a router). That is to say, the communication control interface 104 has a function to communicate data to another terminal through a communication line. The communication control interface 104 may have a function to communicate data to the image photographing unit 116 detachably connected to the notebook information processor 100 through the communication line.

The input/output control interface 108 controls the keyboard 112, the display 114, the image photographing unit 116, the rotation angle sensor 118, an open angle sensor 120, and a motor 122. The keyboard 112 corresponds to the keyboard placed in the main body 2, and the display 114 corresponds to the display (monitor) placed in the lid 1.

The control unit 102 has an internal memory that stores a control program such as an operating system (OS), a program defining various procedures, and required data. The control unit 102 performs information processing for executing various processings by the programs or the like. The control unit 102 functionally and conceptually includes a live view displaying unit 102a, a still image obtaining unit 102b, an image processing unit 102c, a photographing start signal generating unit 102d, a brightness adjusting unit 102e, and a rotation angle adjusting unit 102f.

Out of them, the live view displaying unit 102a displays the live view obtained by photographing at least a portion of the keyboard 112 within the photographing area of the image photographing unit 116 on the display 114. The live view displaying unit 102a may obtain the live view obtained by photographing at least a portion of the keyboard 112 within the photographing area of the image photographing unit 116 and perform the projective transformation on the obtained live view so as to obtain the live view photographed from the front direction, thereby displaying the live view after the projective transformation to be explained later on the display 114.

The still image obtaining unit 102b obtains the still image from the live view displayed on the display 114 by the live view displaying unit 102a, when receiving the photographing start signal to start photographing the still image of the document put on the keyboard 112.

The image processing unit 102c performs the projective transformation on the still image obtained by the still image obtaining unit 102b so as to obtain the image photographed from the front direction, executes the image processing so as to perform the cropping to clip the document, and stores the transformed image of the document after the image processing in the image database 106a. When the live view displaying unit 102a displays the live view after the projective transformation on the display 114, the image processing unit 102c may execute the image processing on the still image obtained by the still image obtaining unit 102b so as to perform the cropping to clip the document, and store the transformed image of the document after the image processing in the image database 106a. The image processing unit 102c may detect the corner of the document by comparing the first image in which the document is not on the keyboard 112 and the second image in which the document is on the keyboard 112 obtained by the image photographing unit 116, as the cropping.

Figure 7:
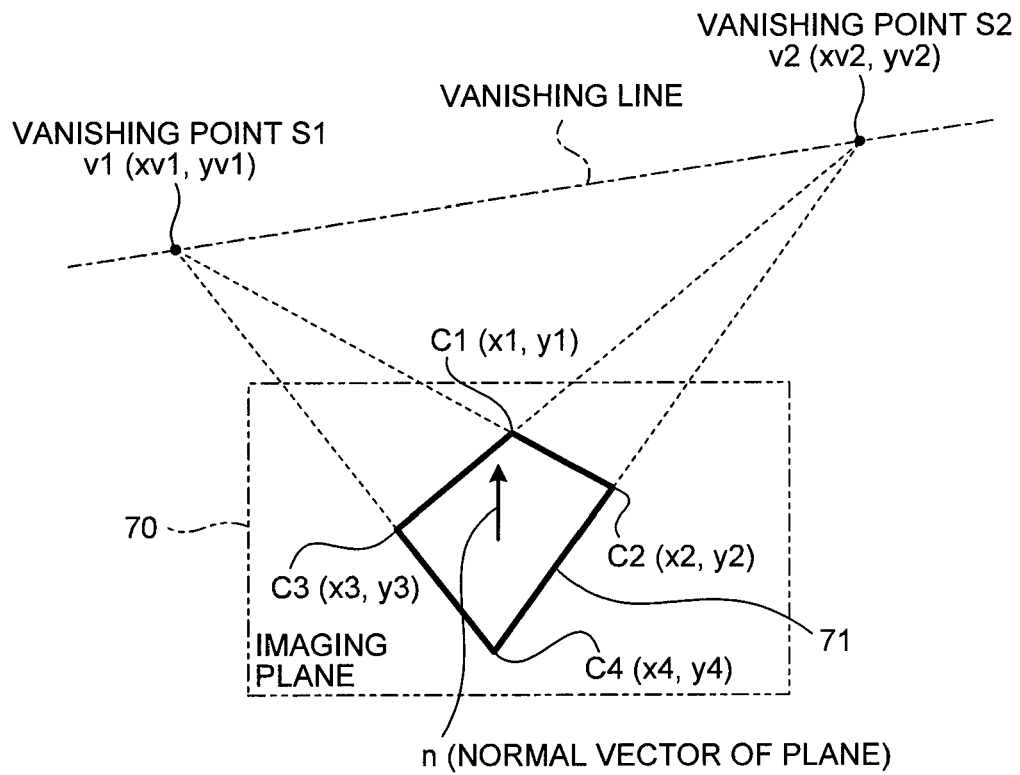
FIG. 7 is a view showing one example of a projective transformation according to the embodiment.

The projective transformation performed by the image processing unit 102c and the live view displaying unit 102a are explained with reference to FIGS. 7 and 8.

The projective transformation performed by the image processing unit 102c and the live view displaying unit 102a, for example, is executed by restoring the image photographed by the image photographing unit 116 to an original state by using an inverse projective transformation. An example of the projective transformation is explained below. When performing the projective transformation, a vanishing point of the image on an imaging plane 70 being an image plane photographed by the image photographing unit 116 is obtained. For example, when an imaging plane shape 71 being an image shape on the imaging plane 70 is the rectangle as shown in FIG. 7, the two vanishing points S1 and S2 are obtained. The vanishing point is the point at which extended lines of two straight lines, which are formed parallel in an actual shape, cross to each other, when projecting a predetermined shape. By thus obtaining the vanishing point, an original size before the projection and the projective transformation parameters being the parameters when performing the projective transformation are obtained based on the vanishing point, and the projective transformation is performed using a following [Equation 1]. That is to say, the projective transformation is performed by obtaining a coordinate (u,v,1) after the projective transformation from a coordinate (x,y,1) before the projective transformation by the [Equation 1].

[Equation 1]

$$\begin{pmatrix} u \\ v \\ 1 \end{pmatrix} = \frac{1}{a31x + a32 + 1} \begin{pmatrix} a11 & a12 & a13 \\ a21 & a22 & a23 \\ a31 & a32 & 1 \end{pmatrix} \begin{pmatrix} x \\ y \\ 1 \end{pmatrix}$$ (Equation 1)

Figure 8:
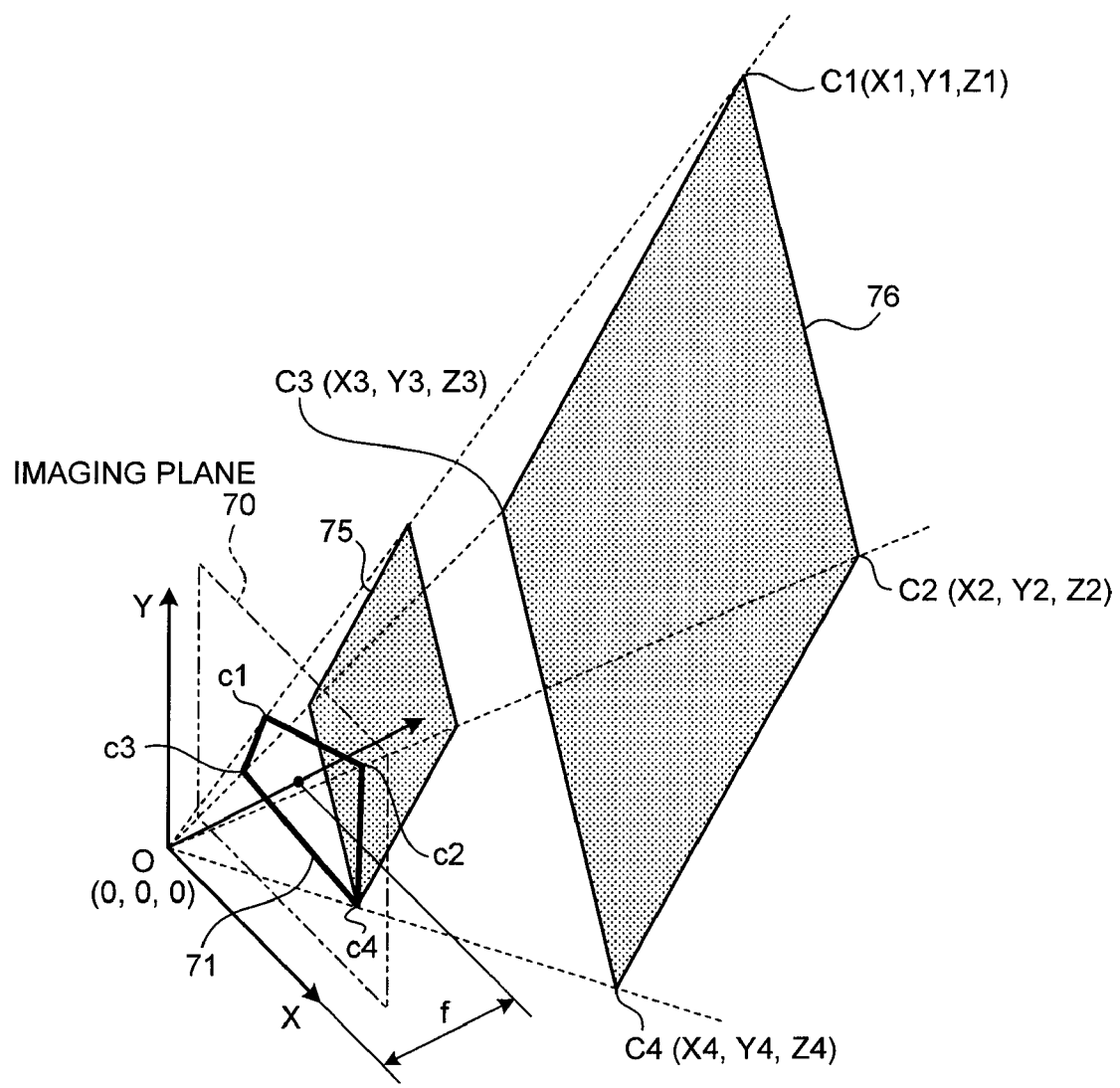
FIG. 8 is a view showing one example of the projective transformation according to the embodiment.

By thus performing the projective transformation on the coordinate of the imaging plane shape 71, which is the coordinate before the projective transformation, a projectively transformed shape 75, which is the shape after the projective transformation, may be obtained as shown in FIG. 8 by obtaining the coordinate after the projective transformation. The projectively transformed shape 75 is similar to an original shape 76, which is the shape when seeing the original imaged by the image photographing unit 116 from the front direction, that is to say, the shape when seeing the imaged plane in the vertical direction.

That is to say, in this embodiment, since the image photographing unit 116 does not photograph the document such as the paper document from the front direction, the photographed image of the document such as the paper document is distorted. For the distorted image, the image processing unit 102c and the live view displaying unit 102a correct the distortion by performing the projective transformation, further perform the cropping (trimming) to clip the document from a background, and store the document in the storage unit 106. At that time, the image processing unit 102c may display the transformed image after the image processing on the display 114 (display). As explained above, the projective transformation by the image processing unit 102c may be to perform the image processing together with the cropping to be explained later after obtaining the image by the still image obtaining unit 102b, or to successively perform the projective transformation processing to the image transferred from the image photographing unit 116 (WEB camera) by the live view displaying unit 102a to display the image on the display 114 as the live view. In this case, the user may look at the image as if photographed from the front direction, so that the document may be set more naturally. Various conventional technologies other than the above-described technique may be used as the projective transformation.

An example of the cropping performed by the image processing unit 102c is explained with reference to FIG. 9.

Figure 9:
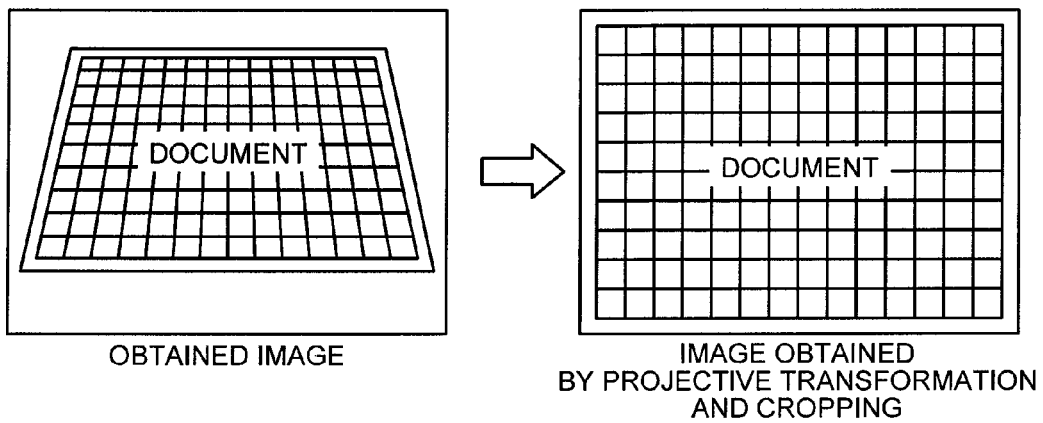
FIG. 9 is a view showing one example of images after the projective transformation and cropping according to the embodiment.

As shown in FIG. 9, in this embodiment, the image processing unit 102c may execute the projective transformation and the cropping (trimming) by displaying the still image obtained by the still image obtaining unit 102b on the display 114 (display), and by the user specifying four corners of the document such as the paper document by means of an input unit (not shown) such as a mouse. The image processing unit 102c extracts a borderline between the document such as the paper document and the plane of the keyboard 112 from brightness information or the like obtained from the still image, performs linear interpolation or the like to the extracted borderline, and calculates the four corners of the document, thereby executing the projective transformation and the cropping (trimming). The image processing unit 102c may photograph in advance the keyboard 112 before setting the document on the keyboard 112 by the image photographing unit 116, extracts an area in which difference in the brightness information or the like with that of the still image obtained by the still image obtaining unit 102b reaches a certain level, performs the linear interpolation or the like to the extracted borderline, and calculates the four corners of the document, thereby executing the projective transformation and the cropping (trimming). Various conventional technologies other than the above-described technique may be used as the cropping.

Referring again to FIG. 3, the photographing start signal generating unit 102d generates the photographing start signal to start photographing the still image of the document put on the keyboard 112.

The photographing start signal generating unit 102d may generate the photographing start signal by allowing the user to click an icon such as "shutter" displayed on the display 114 by means of the input unit (not shown) such as the mouse to transmit the signal to the still image obtaining unit 102b. The photographing start signal generating unit 102d may generate the photographing start signal by detecting a specific sound input by the user by means of the input unit (not shown) such as a microphone incorporated in the notebook information processor 100 to transmit the signal to the still image obtaining unit 102b.

The photographing start signal generating unit 102d determines presence of the document by comparing the first image in which the document is not on the keyboard 112 and the second image in which the document is on the keyboard 112 obtained by the image photographing unit 116, and when there is the document, the photographing start signal generating unit 102d may generate the photographing start signal to transmit the signal to the still image obtaining unit 102b.

The brightness adjusting unit 102e adjusts the brightness of the display 114 when obtaining the still image by the still image obtaining unit 102b.

In this embodiment, although an environment light such as an interior light placed in an office or the like is used as the light to illuminate the keyboard 112 on which the document is put, light of the display 114 (display) of which brightness is adjusted by the brightness adjusting unit 102e may be used as the auxiliary light. That is to say, the brightness adjusting unit 102e sets an entire screen of the display 114 to a certain image (such as a full white screen with maximum brightness) at the time that the still image obtaining unit 102b receives the photographing start signal (image obtaining trigger) generated by the photographing start signal generating unit 102d, thereby illuminating the document such as the paper document on the keyboard 112. When the open angle θ of the display 114 (display) is, for example, equal to or larger than 90 degrees, the light of the display 114 (display) is never reflected by the document such as the paper document to appear (that is to say, glares), so that it is possible to use the light of the display 114 (display) of which brightness is adjusted by the brightness adjusting unit 102e as an excellent auxiliary light source.

The rotation angle adjusting unit 102f adjusts the rotation angle γ of the motor 122 so as to adjust the photographing direction of the image photographing unit 116, based on the open angle θ detected by the open angle sensor 120.

In this embodiment, for example, with the image photographing unit 116 (camera) of about 5-million pixel or higher, a practically sufficient level of quality of the image photographed by the image photographing unit 116 may be obtained as a document scanner. Although the notebook information processor 100 according to this embodiment is supposed to be used, for example, by the user such as the businessman, outside such as in a hotel of a business trip destination and when visiting a customer, the advantage in the installation area and simple operation are not lost even when this is used at his desk in an office or the like.

Process of Notebook Information Processor 100

An example of the image reading process of the process of the notebook information processor 100 according to the embodiment thus configured is explained in detail with reference to FIGS. 10 and 11.

Image Reading Process

Details of the image reading process will be explained with reference to FIG. 10.

Figure 10:
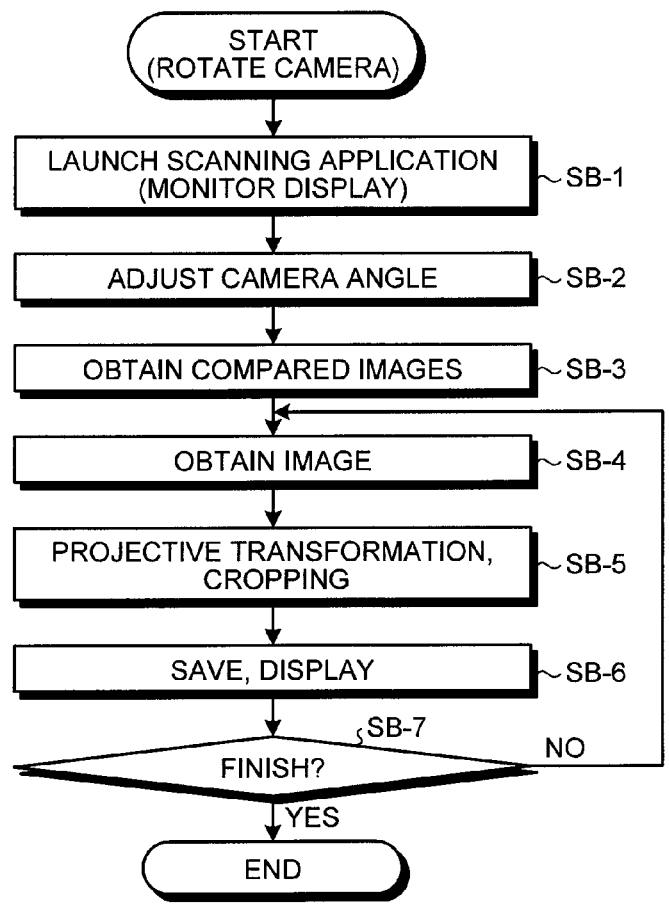
FIG. 10 is a flowchart showing one example of an image reading process of the notebook information processor 100 according to the embodiment.
Figure 11:
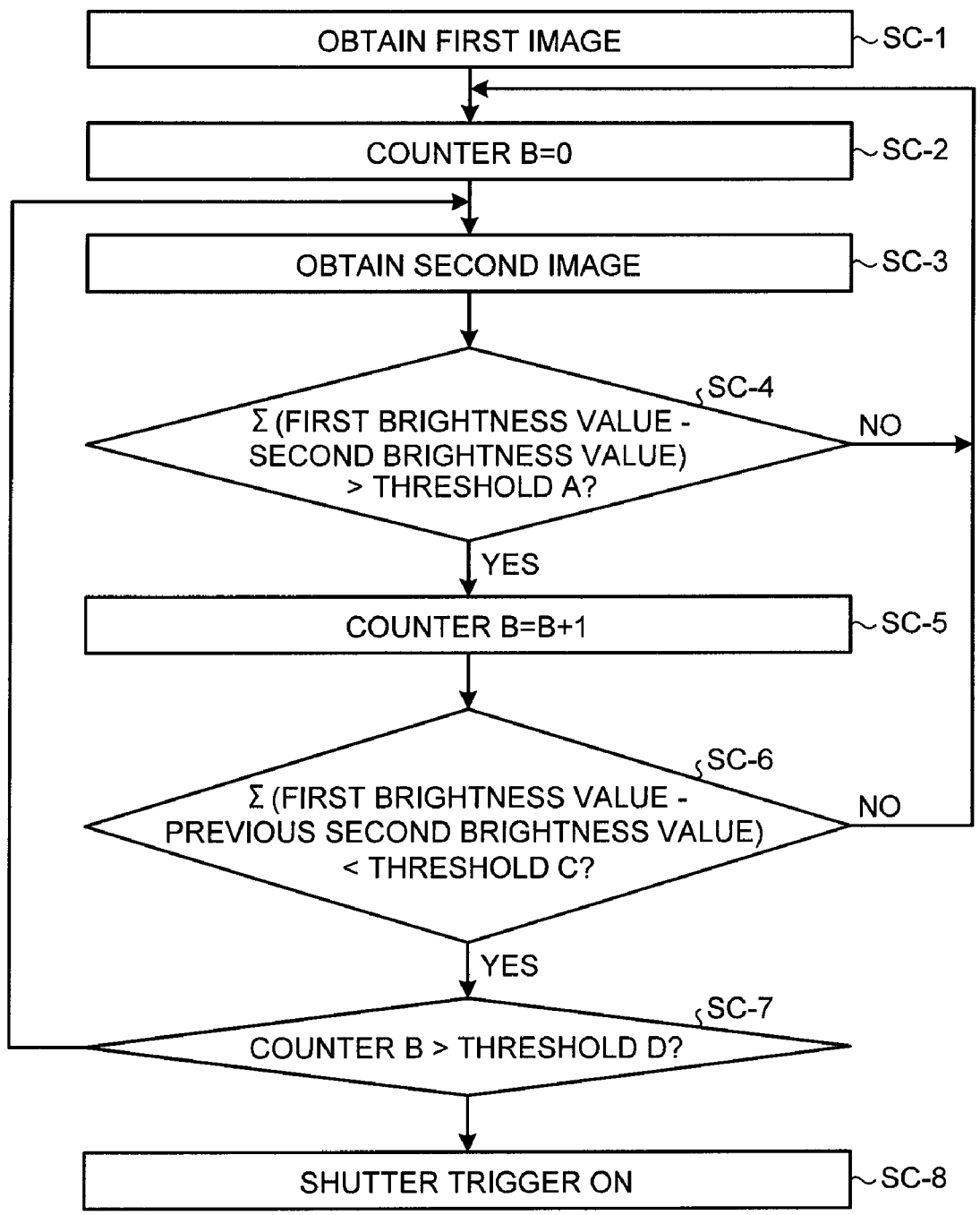
FIG. 11 is a flowchart showing one example of a photographing start signal generating process of the notebook information processor 100 according to the embodiment.

As shown in FIG. 10, when the image photographing unit 116 (camera) rotatably placed in the notebook information processor 100 is rotated in the photographing direction of the plane (document plane) of the keyboard 112, the rotation angle sensor 118 detects the rotation of the image photographing unit 116. The control unit 102 automatically launches the scanning application and displays the same on the display 114 (monitor) to shift to the scanner mode to photograph the plane (document plane) of the keyboard 112 (Step SB-1).

By the process by the live view displaying unit 102a, the motion image photographed by the image photographing unit 116 is displayed on the display 114 (display) as the live view in real time. That is to say, the live view displaying unit 102a displays the live view obtained by photographing at least a portion of the keyboard 112 within the photographing area of the image photographing unit 116 on the display 114. The user adjusts the angle of the image photographing unit 116 while looking at the live view displayed on the display 114 (Step SB-2). The live view displaying unit 102a may obtain the live view obtained by photographing at least a portion of the keyboard 112 within the photographing area of the image photographing unit 116, and perform the projective transformation on the obtained live view so as to obtain the live view photographed from the front direction, thereby displaying the live view after the projective transformation to be explained later on the display 114.

The rotation angle adjusting unit 102f may adjust the rotation angle γ of the motor 122 so as to adjust the photographing direction of the image photographing unit 116 based on the open angle θ detected by the open angle sensor 120.

The photographing start signal generating unit 102d obtains the first image in which the document is not on the keyboard 112 and the second image in which the document is on the keyboard 112 as compared images, determines presence of the document, and generates the photographing start signal when there is the document to transmit the signal to the still image obtaining unit 102b (Step SB-3). Photographing start signal generation by the photographing start signal generating unit 102d is explained in detail below.

The still image obtaining unit 102b obtains the image of the document by obtaining the still image from the live view displayed on the display 114, when receiving the photographing start signal to start photographing the still image of the document put on the keyboard 112 from the photographing start signal generating unit 102d (Step SB-4).

The brightness adjusting unit 102e may adjust the brightness of the display 114 when obtaining the still image by the still image obtaining unit 102b.

The image processing unit 102c performs the projective transformation on the still image obtained by the processing by the still image obtaining unit 102b so as to obtain the image photographed from the front direction, and executes the image processing so as to perform the cropping to clip the document (Step SB-5). The image processing unit 102c displays the transformed image of the document after the image processing on the display 114 and stores the same in the image database 106a (Step SB-6). When displaying the live view after the projective transformation on the display 114 at Step SB-2, the image processing unit 102c may execute the image processing on the still image obtained by the processing by the still image obtaining unit 102b so as to perform the cropping to clip the document, and store the transformed image of the document after the image processing in the image database 106a.

The image processing unit 102c may detect the corner of the document to perform cropping by comparing the first image in which the document is not on the keyboard 112 and the second image in which the document is on the keyboard 112 obtained by using the image photographing unit 116 by the process by the control unit 102 at Step SB-4.

The control unit 102 determines whether to finish the image reading process by determining whether a next document is set on the keyboard 112 (Step SB-7). When the control unit 102 determines not to finish the image reading process (NO at Step SB-7), the process returns to Step SB-4 to continue the image reading process with the next document. On the other hand, when the control unit 102 determines to finish the image reading process (YES at Step SB-7), the image reading process is finished.

Photographing Start Signal Generating Process

Details of the photographing start signal generating process will be explained with reference to FIG. 11.

The photographing start signal generating unit 102*d* obtains in advance the image (first image) of the keyboard 112 before setting the document on the keyboard 112 by photographing using the image photographing unit 116 (Step SC-1).

The photographing start signal generating unit 102*d* initializes a counter B to "0" (Step SC-2).

The photographing start signal generating unit 102*d* obtains the image (second image) including the document set on the keyboard 112 by photographing using the image photographing unit 116 (Step SC-3).

The photographing start signal generating unit 102*d* continuously monitors the brightness information or the like of the photographed motion image input by means of the image photographing unit 116 (camera) and determines whether the difference in brightness value or the like between the image (first image) of the keyboard 112 obtained in advance and the image (second image) including the document set on the keyboard 112 reaches a certain level (Σ(brightness value of the first image−brightness value of the second image)>threshold A?) by the process by the control unit 102, thereby determining whether the document such as the document is started to be set on the keyboard 112. (Step SC-4). When it is determined that the difference is equal to or smaller than the threshold A and that the document such as the document is not set on the keyboard 112 (NO at Step SC-4), the photographing start signal generating unit 102*d* returns to the process at Step SC-2. On the other hand, when it is determined that the difference is larger than the threshold A and that the document such as the document is started to be set on the keyboard 112 (YES at Step SC-4), the photographing start signal generating unit 102*d* proceeds to a process at next Step SC-5.

The photographing start signal generating unit 102*d* counts the counter B to "1" (Step SC-5).

The photographing start signal generating unit 102*d* determines whether variation in the difference is stable at a certain level (Σ(brightness value of the second image−brightness value of the previous second image)<threshold C?), thereby determining whether the setting of the document is finished (Step SC-6). When it is determined that the difference is equal to or larger than the threshold C and the variation in the difference is not stable at the certain level (NO at Step SC-6), the photographing start signal generating unit 102*d* returns to the process at Step SC-2. On the other hand, the photographing start signal generating unit 102*d* proceeds to a process at next Step SC-7 when it is determined that the difference is equal to or smaller than the threshold C and the variation in the difference is stable at the certain level (YES at Step SC-6).

The photographing start signal generating unit 102*d* determines whether a predetermined time period has passed (counter B>threshold D?) (Step SC-7) When it is determined that the counter B is equal to or smaller than the threshold value and the predetermined time period has not passed (NO at Step SC-7), the photographing start signal generating unit 102*d* returns to the process at Step SC-3. On the other hand, when it is determined that the counter B is larger than the threshold value and that the predetermined time period has passed (YES at Step SC-7), the photographing start signal generating unit 102*d* proceeds to a process at next Step SC-8.

The photographing start signal generating unit 102*d* generates the photographing start signal (shutter trigger) to transmit the signal to the still image obtaining unit 102*b* (Step SC-8).

The still image obtaining unit 102*b* obtains the still image from the live view displayed on the display 114 when receiving the photographing start signal to start photographing the still image of the document put on the keyboard 112 from the photographing start signal generating unit 102*d* (shutter trigger ON). The control unit 102 may inform the user of obtaining the vocal and the still image by means of an output unit (not shown) such as a speaker, or the display 114 (display), respectively, after the still image is obtained by the process by the still image obtaining unit 102*b*. When the number of the documents to be scanned is large, a semi-automated operation becomes possible by repeating this.

Other Embodiments

The embodiments of the present invention are explained above. However, the present invention may be executed in not only the embodiments but also various different embodiments without departing from the spirit and scope of the general inventive concept as defined by the appended claims and their equivalents.

In the embodiment, the notebook information processor 100 that performs processing in a standalone mode is explained as an example. However, processing may be performed depending on a request from a client terminal constructed in a housing different from the housing of the notebook information processor 100, and the processing result may be returned to the client terminal.

All the automatic processes explained in the present embodiment can be, entirely or in part, carried out manually. Similarly, all the manual processes explained in the present embodiment can be, entirely or in part, carried out automatically by a known method.

The process procedures, the control procedures, specific names, information including registration data of each process and parameters of search condition etc., display example, database structure mentioned in the description and drawings can be changed as required unless otherwise specified.

The constituent elements of the notebook information processor 100 are merely conceptual and may not necessarily physically resemble the structures shown in the drawings. For instance, the apparatus need not necessarily have the structure that is illustrated.

For example, the process functions performed by the notebook information processor 100, especially regarding each of the process functions executed at the control unit 102, can be entirely or partially realized by a central processing unit (CPU) or a computer program executed by the CPU or by a hardware using wired logic. The computer program, recorded on a recording medium, can be mechanically read by the i notebook information processor 100 as the situation demands. In other words, the computer program recorded on the recording medium can cause the storage unit 106 such as read-only memory (ROM) or hard disk (HD) to work in coordination with OS to issue commands to the CPU and cause the CPU to perform various processes. The computer program is first loaded to the random access memory (RAM), and forms a control unit 102 in collaboration with the CPU.

Alternatively, the computer program can be stored in any application program server connected to the notebook information processor s 100 via the network 300, and can be fully or partially loaded as the situation demands.

"Computer-readable recording medium" on which the computer program can be stored may be a portable type such as flexible disk, magneto optic (MO) disk, ROM, erasable programmable ROM (EPROM), electrically erasable programmable ROM (EEPROM), compact disk-read-only memory (CD-ROM), digital versatile disk (DVD), or a communication medium that stores the computer program for a short term such as communication channels or carrier waves that transmit the computer program over networks 300 such as local area network (LAN), wide area network (WAN), and the Internet.

"Computer program" refers to a data processing method written in any computer language and can have software codes and binary codes in any format. The computer program can be a dispersed form in the form of a plurality of modules or libraries, or can perform various functions in collaboration with a different program such as the OS. Any known configuration in the image-reading processing apparatus according to the embodiment can be used for reading the recording medium. Similarly, any known process procedure for reading or installing the computer program can be used.

The storage unit 106 (such as image database 106*a*) is a fixed disk device such as RAM, ROM, and HD or flexible disk, optical disk, and stores therein various programs, tables, databases required for various processes and opening websites.

The notebook information processor 100 can also be connected to any existing personal computer, workstation, etc. and can be operated by executing software (that includes computer program, data, etc.) that implements the method according to the present invention in the personal computer or workstation.

Moreover, a specific manner of distribution, and integration of the apparatus is not limited to the example as described in the drawing. A part or all of the apparatus can be distributed or integrated functionally or physically in an arbitrary unit depending on various additions.

According to the present invention, since the document such as the paper document is put on the keyboard, the area equal to or larger than the notebook information processor is not required as the installation area of the document to be photographed, and it is possible to check in real time before capturing the image so as to adjust the photographing area. In addition, the image processing may be performed to the captured image in real time so as to obtain the image of the document photographed from the front direction and clipped from the background. Thereby, there is the effect to achieve the scanner function of which efficiency and accuracy when capturing the image are improved with the minimum device weight and installation area.

According to the present invention, it is possible to determine presence of the document, thereby obtaining the photographing start signal as the trigger timing to obtain the still image. Especially, when the number of documents is large, it is possible to semi-automatically obtain the still image by repeating this. Thereby, there is the effect to achieve the scanner function of which efficiency and accuracy when capturing the image are improved.

According to the present invention, it is possible to temporally change the brightness of the display when photographing the document and use the brightness of the display as the auxiliary light source. Thereby, there is the effect to achieve the scanner function of which efficiency and accuracy when capturing the image are improved.

According to the present invention, it is possible to correctly and rapidly detect the corner of the borderline of the document, which is important in the cropping process. Thereby, there is the effect to achieve the scanner function of which efficiency and accuracy when capturing the image are improved.

According to the present invention, for example, this may be formed as the existing notebook information processor or the like to which the existing digital camera or the like is USB connected, and be easily added or placed on the monitor or the like. Thereby, there is the effect to achieve the scanner function of which efficiency and accuracy when capturing the image are improved with the minimum device weight and installation area.

According to the present invention, the photographing direction of the image photographing unit may be appropriately changed as needed. Thereby, there is the effect to achieve the scanner function of which efficiency and accuracy when capturing the image are improved.

According to the present invention, it is possible to automatically detect that the photographing direction of the image photographing unit is changed from the initial position at which this acts as the WEB camera to photograph the user or the like. When detecting the change to the photographing direction, this may perform the automatic process so as to automatically launch the scanning software to shift to the scanner mode. Thereby, there is the effect to achieve the scanner function of which efficiency and accuracy when capturing the image are improved.

According to the present invention, it is possible to automatically adjust the photographing direction of the image photographing unit so as to be able to photograph the document put on the keyboard according to the opening degree of the notebook information processor, which the user opens. Thereby, there is the effect to achieve the scanner function of which efficiency and accuracy when capturing the image are improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A notebook information processor comprising an image photographing unit, a display, a keyboard, a storage unit, and a control unit, wherein
    the control unit includes:
    a live view displaying unit that displays a live view obtained by photographing at least a portion of the keyboard within a photographing area of the image photographing unit on the display;
    a still image obtaining unit that obtains a still image from the live view displayed on the display by the live view displaying unit, when receiving a photographing start signal to start photographing the still image of a document put on the keyboard; and
    an image processing unit that performs projective transformation on the still image obtained by the still image obtaining unit so as to obtain an image photographed from a front direction, executes image processing so as to perform cropping to clip the document, and stores a transformed image of the document after the image processing in the storage unit.

2. The notebook information processor according to claim 1, wherein
the control unit further includes:
a brightness adjusting unit that adjusts brightness of the display when obtaining the still image by the still image obtaining unit.

3. The notebook information processor according to claim 1, wherein
the cropping by the image processing unit detects a corner of the document by comparing a first image in which the document is not on the keyboard and a second image in which the document is on the keyboard obtained by the image photographing unit.

4. The notebook information processor according to claim 1, wherein the image photographing unit is detachably placed in the notebook information processor, electrified by the notebook information processor, and is communicatably connected to the notebook information processor.

5. The notebook information processor according to claim 1, wherein the image photographing unit is rotatably placed in the notebook information processor so as to be able to change a photographing direction.

6. The notebook information processor according to claim 5, wherein the notebook information processor further includes a rotation angle sensor that detects a rotation angle when rotating the image photographing unit so as to change the photographing direction.

7. The notebook information processor according to claim 5, wherein
the notebook information processor includes a lid in which at least the image photographing unit is placed, and a main body in which at least the keyboard is placed, and further includes an open angle sensor that detects an open angle of the lid with respect to the main body, and a motor that adjusts a rotation angle of the image photographing unit, and
the control unit further includes:
a rotation angle adjusting unit that adjusts a rotation angle of the motor so as to adjust the photographing direction of the image photographing unit based on the open angle detected by the open angle sensor.

8. A notebook information processor, comprising an image photographing unit, a display, a keyboard, a storage unit, and a control unit, wherein
the control unit includes:
a live view displaying unit that obtains a live view obtained by photographing at least a portion of the keyboard within a photographing area of the image photographing unit, and performs projective transformation on the obtained live view so as to obtain the live view photographed from a front direction, thereby displaying the live view after the projective transformation on the display;
a still image obtaining unit that obtains a still image from the live view displayed on the display by the live view displaying unit, when receiving a photographing start signal to start photographing the still image of a document put on the keyboard; and
an image processing unit that executes image processing to the still image obtained by the still image obtaining unit so as to perform cropping to clip the document, and stores a transformed image of the document after the image processing in the storage unit.

9. The notebook information processor according to claim 1, wherein
the control unit further includes:
a photographing start signal generating unit that determines presence of the document by comparing a first image in which the document is not on the keyboard and a second image in which the document is on the keyboard obtained by the image photographing unit, and when there is the document, generates the photographing start signal to transmit the signal to the still image obtaining unit.

10. An image reading method executed by a notebook information processor including an image photographing unit, a display, a keyboard, a storage unit, and a control unit, the method comprising:
a live view displaying step of displaying a live view obtained by photographing at least a portion of the keyboard within a photographing area of the image photographing unit on the display;
a still image obtaining step of obtaining a still image from the live view displayed on the display at the live view displaying step, when receiving a photographing start signal to start photographing the still image of a document put on the keyboard; and
an image processing step of performing projective transformation on the still image obtained at the still image obtaining step so as to obtain an image photographed from a front direction, executing image processing so as to perform cropping to clip the document, and storing a transformed image of the document after the image processing in the storage unit.

11. The image reading method according to claim 10, the control unit further comprising:
a photographing start signal generating step of determining presence of the document by comparing a first image in which the document is not on the keyboard and a second image in which the document is on the keyboard obtained by the image photographing unit, and when there is the document, generating the photographing start signal to transmit the signal to the still image obtaining step.

12. The image reading method according to claim 10, the control unit further comprising:
a brightness adjusting step of adjusting brightness of the display when obtaining the still image at the still image obtaining step.

13. The image reading method according to claim 10, wherein
the cropping at the image processing step detects a corner of the document by comparing a first image in which the document is not on the keyboard and a second image in which the document is on the keyboard obtained by the image photographing unit.

14. The image reading method according to claim 10, wherein the image photographing unit is detachably placed in the notebook information processor, electrified by the notebook information processor, and is communicatably connected to the notebook information processor.

15. The image reading method according to claim 10, wherein the image photographing unit is rotatably placed in the notebook information processor so as to be able to change a photographing direction.

16. The image reading method according to claim 15, wherein the notebook information processor further includes a rotation angle sensor that detects a rotation angle when rotating the image photographing unit so as to change the photographing direction.

17. The image reading method according to claim 15, wherein the notebook information processor includes a lid in which at least the image photographing unit is placed, and a main body in which at least the keyboard is placed, and further includes an open angle sensor that detects an open angle of the lid with respect to the main body, and a motor that adjusts a rotation angle of the image photographing unit, and the method further comprising:

a rotation angle adjusting step of adjusting a rotation angle of the motor so as to adjust the photographing direction of the image photographing unit based on the open angle detected by the open angle sensor.

18. An image reading method executed by a notebook information processor including an image photographing unit, a display, a keyboard, a storage unit, and a control unit, the method comprising:

a live view displaying step of obtaining a live view obtained by photographing at least a portion of the keyboard within a photographing area of the image photographing unit, and performing projective transformation on the obtained live view so as to obtain the live view photographed from a front direction, thereby displaying the live view after the projective transformation on the display;

a still image obtaining step of obtaining a still image from the live view displayed on the display at the live view displaying step, when receiving a photographing start signal to start photographing the still image of a document put on the keyboard; and an image processing step of executing image processing to the still image obtained at the still image obtaining step so as to perform cropping to clip the document, and storing a transformed image of the document after the image processing in the storage unit.

* * * * *